United States Patent
Duffett-Smith et al.

[11] Patent Number: 6,094,168
[45] Date of Patent: Jul. 25, 2000

[54] POSITION DETERMINING SYSTEM

[75] Inventors: Peter James Duffett-Smith, Cambridge; Keith James Bruno Grainge, Buckinghamshire, both of United Kingdom

[73] Assignee: Cambridge Positioning Systems Ltd., Cambridge, United Kingdom

[21] Appl. No.: 09/043,221

[22] PCT Filed: Sep. 16, 1996

[86] PCT No.: PCT/GB96/02308

§ 371 Date: Mar. 17, 1998

§ 102(e) Date: Mar. 17, 1998

[87] PCT Pub. No.: WO97/11384

PCT Pub. Date: Mar. 27, 1997

[30] Foreign Application Priority Data

Sep. 19, 1995 [GB] United Kingdom .................... 9519087

[51] Int. Cl.[7] .............................. H04B 7/185; G01S 5/02
[52] U.S. Cl. .................... 342/463; 342/464; 342/457; 342/375
[58] Field of Search ................................ 342/463, 457, 342/464, 465, 375

[56] References Cited

U.S. PATENT DOCUMENTS

| | | | |
|---|---|---|---|
| 5,045,861 | 9/1991 | Duffett-Smith et al. | 342/457 |
| 5,208,756 | 5/1993 | Song | 364/449 |
| 5,293,642 | 3/1994 | Lo | 455/33.1 |
| 5,293,645 | 3/1994 | Sood | 455/54.1 |
| 5,327,144 | 7/1994 | Stilp et al. | 342/387 |
| 5,365,450 | 11/1994 | Schuchman et al. | 364/449 |
| 5,422,813 | 6/1995 | Schuchman et al. | 364/449 |
| 5,512,909 | 4/1996 | Kronhamn | 342/417 |
| 5,519,618 | 5/1996 | Kastner et al. | . |
| 5,568,153 | 10/1996 | Beliveau | 342/357 |
| 5,600,706 | 2/1997 | Dunn | 379/59 |
| 5,604,765 | 2/1997 | Bruno et al. | 375/200 |
| 5,612,729 | 3/1997 | Ellis et al. | 348/2 |
| 5,613,205 | 3/1997 | Dufour | 455/33.2 |
| 5,701,328 | 12/1997 | Schuchman et al. | 375/204 |
| 5,729,694 | 3/1998 | Holzrichter et al. | 395/2.17 |
| 5,838,279 | 11/1998 | Duffett-Smith et al. | 342/459 |

FOREIGN PATENT DOCUMENTS

| | | |
|---|---|---|
| 2254508 | 10/1992 | United Kingdom . |
| 2260050 | 3/1993 | United Kingdom . |
| 2284054 | 12/1997 | United Kingdom . |
| WO 95/23981 | 9/1995 | WIPO . |
| 9728455 | 8/1997 | WIPO . |
| 9728456 | 8/1997 | WIPO . |
| 9818018 | 4/1998 | WIPO . |
| 9819488 | 5/1998 | WIPO . |

OTHER PUBLICATIONS

P.J. Duffett–Smith and G. Woan, "The Cursor Radio Navigation and Tracking System", *Journal of Navigation*, vol. 45, No. 2, pp. 157–165 (1992).

*Primary Examiner*—Theodore M. Blum
*Attorney, Agent, or Firm*—Roylance, Abrams, Berdo & Goodman, L.L.P.

[57] ABSTRACT

The invention relates to a position determining system, for receiving digital telephone signals transmitted by a number of transmission sources BTS. The system has a pair of receiving stations, CBU and CRU, one at a known position O and another on a roving object R; a position determining processor CPP; and means for passing a link signal, L1 and L2, from each of the receiving stations to the position determining processor, the link signal containing information about the signals received at the receiving station from the transmission sources. Each of the receiving stations is arranged to receive the signals from the respective transmission sources substantially simultaneously. The position determining processor is arranged to compare the information received from the one receiving station with the information received at the other receiving station, and to determining the time delay between the respective signals received at both receiving stations in order to determine the position of the roving object.

18 Claims, 8 Drawing Sheets

POSITION DETERMINING SYSTEM

This invention relates to a position determining system using radio or other broadcast transmissions. More particularly, it relates to a system using the Global System for Mobile Communications (GSM) or other digital transmission systems.

In our European Patent EP-B-0 303 371 we describe a radio navigation and tracking system, now known as 'CURSOR', which uses the spatial coherence of the signals from several radio transmitters to determine the position of a roving receiver. Its principles are explained in the above patent specification where it is shown how the signals received directly by the roving receiver (rover) are compared with those received by a fixed base station whose location is known (base) to determine their phase difference, and hence the difference in range of the base and rover from each transmitter. Three such measurements made on independent transmitters are needed for navigation and tracking in two dimensions to fix the position of the rover relative to the base station and network of transmitters. The unknown quantities calculated for each new position are the spatial x and y co-ordinates of the rover together with the phase offset between the local oscillators in the equipment of the two receivers. A further patent specification, WO 94/28432, shows how the same principles may be applied in tunnels and other shielded spaces such as underground car parks. Duffett-Smith and Woan (Journal of Navigation, 45, 157, 1992) describe a particular implementation of the phase-measuring system in which the signals from three or more medium-wave AM public broadcast stations are used to track the position of a vehicle in and around Cambridge, UK, at speeds up to 110 km h$^{-1}$, with a precision of about 5 m. One of the advantages of such a system lies in the fact that no additional costly infrastructure of coherent radio transmitters needs to be set up for CURSOR operation. On the contrary, CURSOR is able to use the signals from any independent radio transmitters set up for any purpose.

EP-B-0 303 371 also explains how the wider bandwidth signals of modulated transmissions may be used to measure the time difference between the signals received from each transmitter at the base station and the rover. In this case, the position of the peak in the cross correlation can be used as an estimator of the time difference between the two received signals, and hence the difference in distance from the transmitter of the base and rover. As with the phase-measuring system, three such measurements made on three widely-spaced transmitters suffice to calculate the spatial x and y co-ordinates of the rover together with the time offset between the oscillators in the two receiving stations.

Mobile telephones are increasingly using GSM and other digital techniques, and it would be an advantage to add time-measuring CURSOR positioning technology to provide additional services for users. However, signals radiated by digital telephone transmitters are complex and therefore there are problems to be overcome in attempting to combine the technologies.

According to the present invention there is provided a position determining system, for receiving broad band signals transmitted by a number of transmission sources equal at least to the number of dimensions in which the movement of a roving object is to be monitored, the system comprising a pair of receiving stations, in use the first of the receiving stations being at a known position and the second being located on the roving object;

a position determining processor, means for passing a link signal from each of the receiving stations to the position determining processor, the link signal containing information about the signals received at the receiving station from the transmission sources;

wherein each of the receiving stations is arranged to receive the signals from the respective transmission sources substantially simultaneously, and the position determining processor is arranged to compare the information received from the one receiving station about the signals received at the one receiving station from the transmission sources with the information received from the other receiving station about the signals received at the other receiving station from the transmission sources, and to determine the time delay between the respective signals received at both receiving stations in order to determine the position of the roving object.

The receiving stations may receive the signals from the respective transmission sources sequentially and in the same sequence as each other.

The invention also includes a method of determining the position of a roving object, the method comprising transmitting a broadband signal from a number of transmission sources equal at least to the number of dimensions in which the movement of a roving object is to be monitored; receiving the signals at a pair of receiving stations, in use a first of the receiving stations being at a known position and a second being located on the roving object, each of the receiving stations being arranged to receive the signals from the respective transmission sources substantially simultaneously; passing link signals from each of the receiving stations to a position determining processor, the link signals containing information about the signals received at the respective receiving station from the transmission sources, comparing the information received at the position determining processor from the one receiving station about the signals received at the one receiving station from the transmission sources with the information received from the other receiving station about the signals received at the other receiving station from the transmission sources; and determining the time delay between the respective signals received at both receiving stations in order to determine the position of the roving object.

Additionally, the invention includes a method of estimating the offset in time of receipt of a broadcast signal received at two locations, where the signal received at the one location may have been subject to corruption by multipath effects, the method comprising auto-correlating the signals received at the one location; auto-correlating the signals received at the other location; cross-correlating the signals received at the one and other locations; constructing a template comprising that portion of the auto-correlation of the signals received at the other location corresponding to the negative time axis, and that portion of the auto-correlation of the signals received at the one location corresponding to the positive time axis; and measuring the offset at which the template best fits the measured cross-correlation of the signals received at the one and other locations as an estimate of the time offset between the signals received at the two locations.

In some systems, each of the receiving stations is also arranged to receive a second signal from one or more of the transmitters, said second signal being used to enable compensation for changes in equipment offsets during receipt of the sequentially received signals.

The position determining processor may be co-located with one of the receiving stations or may be located remotely.

In one embodiment, the link signal from one of the receiving stations is passed to the other receiving station and from the other receiving station to the position determining processor.

Preferably, for locating purposes, a signal providing information about the position of the roving object is passed from the position determining processor to at least one of the receiving stations.

The system may further comprise one or more monitoring stations and a signal providing information about the position of the roving object may then be passed from the position determining processor to one or more of the monitoring stations.

To provide enhanced functionality, a database server may be connected to the position determining processor, the database server containing data elements relating to a plurality of known positions; and the system further comprises means for passing information about the position of the roving object determined by the position determining processor to the database server; means for retrieving data elements related to the position determined by the position determining processor; and means for passing the data elements to one of the receiving stations or to one or more of the monitoring stations.

The or each receiving station or the or each monitoring station preferably includes a display and the position of the roving object is displayed on the display which may be a dot matrix display.

The database server may contain graphical information and the graphical information is passed to a receiving station or monitoring station and displayed on the display to indicate the position of the roving object.

The transmission sources and receiving stations preferably comprise components of a digital cellular telephone network such as a GSM network. It is advantageous if the receiving stations monitor the strength of the signals of plural transmission sources and select a plurality of sufficiently strong signals for reception.

The quasi-synchronisation between the signals received from the respective transmission sources is preferably achieved by monitoring receipt of a specific portion of the transmitted signals, but may be achieved, alternatively, by means independent of the transmitted signals such as a local clock signal.

The system preferably includes a series of regionally, nationally, or even internationally networked fixed receiving stations to provide wide coverage and usage of the positioning system.

The receiving stations may be capable of receiving two or more channels simultaneously and it may be advantageous to repeat the reception of signals from plural transmission sources.

The description below sets out how the principles of the time-measuring CURSOR system may be applied to a digital radio network such as the GSM telephone system, to enable the position of a receiver, such as a portable telephone handset, to be measured relative to the transmitter network. The equipment used in such a network already incorporates most of that required for position fixing operation, so that its implementation may be achieved with little extra cost. The precision of each position measurement is proportional (amongst other factors) to the inverse of the bandwidth of the signals; for a GSM single channel of 200 KHz bandwidth, the precision is about 50 m. Some improvement on this figure may be obtained in cases where more than three GSM transmitters can be received at both base and rover; they may all then be used in the position determining process.

The principles of operation of a position determining system according to the present invention, and a specific application to GSM technology, will now be described with reference to the accompanying drawings and included tables, in which.

Table 1 shows how the intrinsic measurement error varies with the signal to noise power ratio and the number of bits recorded; and Table 2 gives some results from tests of a position determining system carried out in Cambridge, UK.

PRINCIPLES OF OPERATION

Figure 1:
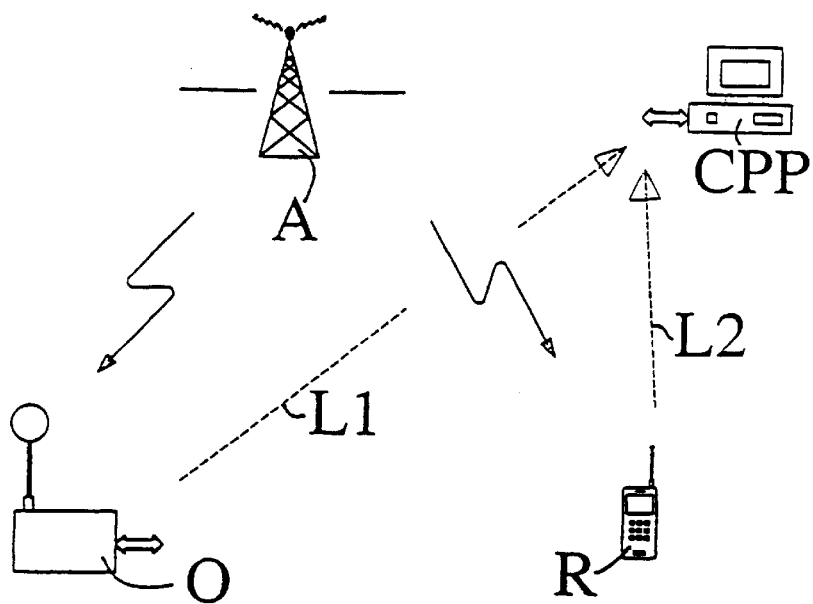
FIG. 1 is a diagram of the basic system elements.
Figure 2:
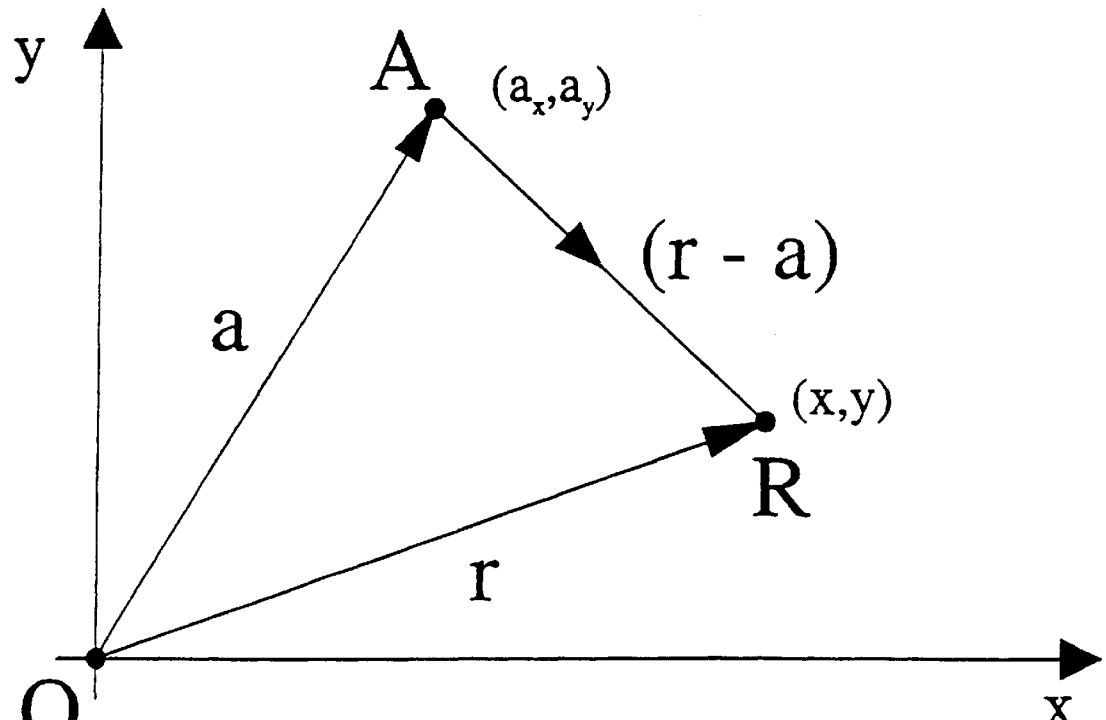
FIG. 2 is a diagram used to define the system co-ordinates.

Let us suppose that a transmitter, A, is broadcasting modulated radio signals within a band of frequencies of width $\Delta v$ centred on frequency $v_o$. The signals are received by a fixed base station, O, and a roving receiver, R, as shown in FIG. 1. We define Cartesian co-ordinates (x, y) with respect to axes centred on the base station, as shown in FIG. 2. The axes can have any orientation, but might conveniently be set so that the y-axis lies along the local mapping grid north-south direction. $\underline{a}=(a_x, a_y)$ is a vector which defines the position of the transmitter, and $\underline{r}=(x, y)$ defines the position of the rover. The vector $\underline{r}-\underline{a}=(x-a_x, y-a_y)$ completes the triangle OAR.

Transmitter A transmits signals continuously. At a prearranged moment the radio receivers in O and R begin receiving and recording a short length of the transmissions. This moment may for example be signalled by the arrival of a trigger transmitted from A, or a trigger derived from the normal signal traffic radiated by A, or a trigger generated locally. The last of these may be achieved, for example, by using a pulse of short duration derived from high-precision clocks at R and O which have been synchronised earlier. In a digital version of this application, the signals might first be converted from $vc_o$ to baseband, digitised, and then recorded in dynamic memory. Although O and R record as near simultaneously as possible, there will nevertheless be a time offset between the two records which is caused both by the difference in the distances AO and AR, and by the synchronisation error between the arrival of the trigger at O and R. Let $\Delta t$ be this time offset; it is given by $$\Delta t = \frac{[(x-a_x)^2 + (y-a_y)^2]^{1/2} - (a_x^2 + a_y^2)^{1/2}}{v} + \varepsilon$$

where $\varepsilon$ is the synchronisation error and $v$ is the speed of the radio waves.

An estimate of Δt may be obtained from the cross correlation of the recordings made at O and R. In FIG. 1 there are shown links, L1 and L2, which represent means of conveying representations of the recordings made at each receiving station to a position determining processor CPP. The nature of the links, whether they convey information in near real time or impose delays, is of no consequence in principle. All that matters is that duplicates of the recordings made by each receiving station are assembled together at the position determining processor for comparison with each other.

Figure 3:
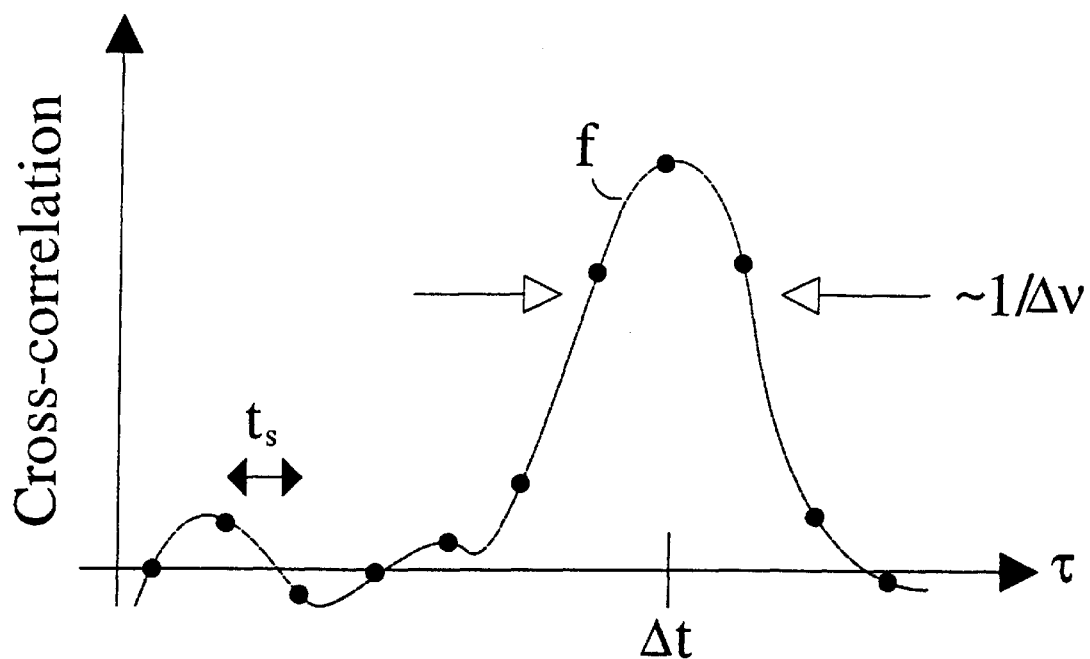
FIG. 3 illustrates calculation of cross correlation functions.

The cross correlation of the two recordings is now performed by the position determining processor using any convenient means. In the case of digital signals, this may best be carried out by a microprocessor which calculates estimates of the function at discrete intervals of time offset, τ, corresponding to the sampling interval, $t_s$, as shown by the dots in FIG. 3. It is unlikely that the peak of the function corresponds with a particular sample, so the microprocessor must also fit an interpolation function, shown by the dashed curve, in order to obtain the best estimate of the position of the peak. The value of τ corresponding to the peak is an estimator of Δt.

This process of quasi-simultaneous recording, conveyance over one or more links, assembly of copies at one place, and estimation of the value of Δt from the cross correlation, must be performed on at least two or three spatially distinct transmitters. If there are means at O and R of synchronising sufficiently accurately, then just two measurements would generally suffice; otherwise, if ε is unknown as is generally the case, at least three measurements are needed Let A, B, and C be the tree transmitters in the latter case, at vector positions $\underline{a}=(a_x, a_y)$, $\underline{b}=(b_x, b_y)$, and $\underline{c}=(c_x, c_y)$. Then the three measurements of Δt are given by $$\Delta t_a = \frac{[(x - a_x)^2 + (y - a_y)^2]^{1/2} - (a_x^2 + a_y^2)^{1/2}}{v} + \varepsilon$$

$$\Delta t_b = \frac{[(x - b_x)^2 + (y - b_y)^2]^{1/2} - (b_x^2 + b_y^2)^{1/2}}{v} + \varepsilon$$

and $$\Delta t_c = \frac{[(x - c_x)^2 + (y - c_y)^2]^{1/2} - (c_x^2 + c_y^2)^{1/2}}{v} + \varepsilon$$

These three non-linear equations can be solved to evaluate x, y, and ε, and hence the position of the rover is determined. Actually, the solution of these three equations is generally ambiguous with two possible pairs of (x, y). Often these are sufficiently far apart that it is obvious which is the correct result (for example, only one might lie within the triangle formed by the three transmitters), but if the ambiguity must be resolved automatically then an extra transmitter must be monitored.

The accuracy of the method depends on the error in the estimator of Δt derived from the cross correlation, and there are three main factors. First, the width of the cross correlation affects the accuracy of the result, since a wider function provides a less sharply-defined peak. The width is inversely proportional to the bandwidth, Δv, of the transmitted signals. Hence, wider bandwidth transmissions provide for more accurate intrinsic position determination. It should be noted here that the "bandwidth" could encompass all the signals radiated from a particular radio mast and not just one particular channel. For example, if ten adjacent channels of 200 KHz width each were active within a total bandwidth of 2 MHz, it may be possible, using a wide-band receiver or one which can receive simultaneously on more than one channel, to make use of all ten at once and thereby obtain the accuracy corresponding to a 2 MHz bandwidth. If some of the channels were inactive, it might nevertheless still be possible to obtain the full accuracy corresponding to the separation of the two channels furthest apart.

Secondly, the signal-to-noise power ratio, r, of the signals is important. Let us assume that we are recording one-bit samples of the received signals converted first to baseband. Each sample is a 'one' or a 'zero' depending on whether the signal is greater than or less than zero at the instant of sampling. We also assume that the signals are contained wholly within a uniform band of frequencies extending from zero to Δv, and that they are sampled at the Nyquist rate equal to 2Δv. The error in the estimation of the position of the peak, Δτ, is related to the average number, q(r), of consecutive samples which contains just one error by the approximate expression $$\Delta \tau \approx \frac{2\sqrt{q(r) - 1}}{(q(r) - 2)\Delta v \sqrt{N}}$$

where N is total number of samples used in the cross correlation. The minimum value of 1 is 2 since even when there is no signal, the one-bit samples have an equal chance of being right as wrong. Here we have assumed that the cross correlation function is triangular in shape rather than the sync-squared function expected for noise signals and square band-pass filters. An error of Δτ adds in quadratically as a position error, Δx, where Δx=vΔτ. The relationship between q(r) and r can be obtained from the following the assumption that the signals are noise-like:

$$q(r) = \frac{1}{P}$$

$$P = \sqrt{\frac{2}{\pi}} \int_{x=0}^{\infty} Q(x\sqrt{r}) \exp\left(-\frac{x^2}{2}\right) dx$$

$$Q(a) = \frac{1}{\sqrt{2\pi}} \int_{x=0}^{\infty} \exp\left(-\frac{x^2}{2}\right) dx$$

With Δv set to 200 KHz, the results shown in Table 1 are obtained

TABLE 1

| S/N Power Ratio r | q | N = 1024 Δx/m | N=4096 Δx/m |
|---|---|---|---|
| 0 | 2.0 | ∞ | ∞ |
| 1 | 4.0 | 81 | 41 |
| 2 | 5.1 | 61 | 31 |
| 3 | 6.0 | 52 | 26 |
| 4 | 6.8 | 47 | 24 |
| 6 | 8.1 | 41 | 20 |
| 10 | 10.3 | 34 | 17 |
| 30 | 17.4 | 25 | 12 |
| 100 | 31.5 | 18 | 9 |

As noted above, the errors on the measurements from each transmitter, say $\Delta x_1$, $\Delta x_2$, $\Delta x_3$, must be added in quadrature with each other and with any other errors in the estimation of the position of the rover. It is interesting to note that quite good results can be obtained even in conditions of poor reception.

Thirdly, and usually the most important in practice, there is the error incurred by not having an accurate knowledge of the paths by which the signals reach the rover. Multipath propagation spreads out the cross correlation, making it harder to estimate the position of the peak. It may also result in a multi-peaked cross correlation with the desired peak having a lower amplitude than others. If all the signals arrive by indirect routes, there may be no peak at all corresponding to the line-of-sight propagation path. It should be noted, however, that multipath propagation always results in a delay of the signals compared to the direct path. Provided that the base station antenna is in the clear above the surrounding clutter so that it receives the most direct signals only, then delayed signals at the rover always appear to the later side of the peak of the cross correlation. (In these circumstances it is possible to alleviate the effects of the multipath propagation as explained later.) Having fitted an appropriate interpolation function to the discrete samples, it is important to choose the smallest value of $\tau$ at which there is a significant amount of signal as that value of $\Delta t$ to be used in the calculation of the position, rather than the position of the peak itself.

Application to GSM

The signals radiated by the transmitters in a GSM network are complex. The flexibility and capacity built into its design are such as to render it difficult, if not impossible, to predict precisely how the allocated spectrum (near 900 MHz and 1800 MHz in Europe) will be used at any moment. The frequency band is split into a number of radio frequency (RF) channels of 200 KHz width, each of which carries frequency modulated (FM) signals divided in time into a sequence of frames. The basic unit is the so-called time division multiple access (TDMA) flame lasting 4.615 ms and further divided into 8 time slots. Each time slot carries 156.25 bits at a rate of 270 Kbits s$^{-1}$ and may represent a 'normal burst' of data and training bits, a 'frequency correction burst' of fixed pattern, a 'synchronisation burst' of data and synchronisation bits, or an 'access burst' with a synchronisation sequence and data. Each of these bursts also carries header, tail, and guard bits. How many of the time slots are being used at any moment in a given frame, and how many of the RF carriers are being broadcast from a given transmitter, depends on the way the system has been set up and on the amount of traffic at that moment. However, in the minimum case when all is quiet one of the RF carriers will always be alive, carrying the so-called broadcast control channel (BCCH; a logical channel), polling for handsets in its cell by broadcasting one access burst in every TDMA frame. We can therefore rely on there being at least one FM broadcast from each transmitter mast with a bandwidth of about 200 KHz, and this we can use for position location.

Figure 4:
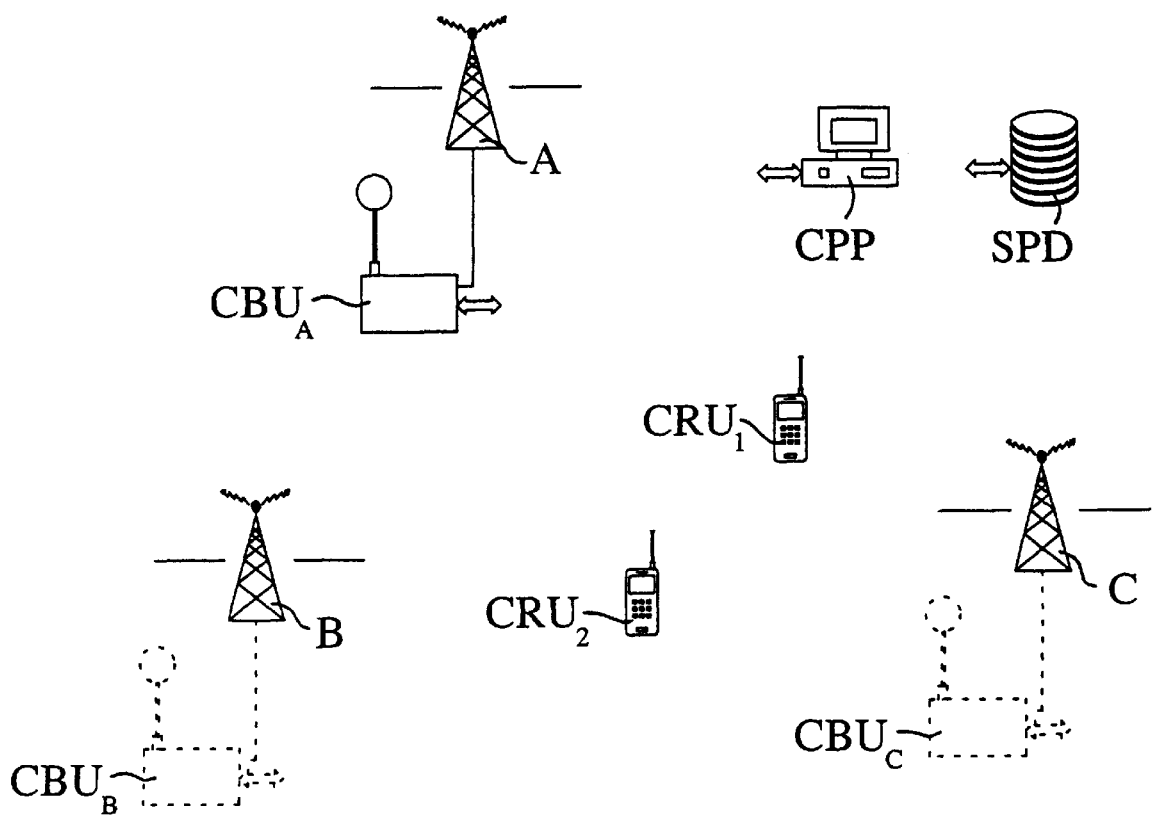
FIG. 4 illustrates a GSM network incorporating the time-measuring technology of the invention, and identifies the logical elements thereof.

A regional GSM network incorporating a positioning system according to the present invention might be as shown in FIG. 4. Here we see base receivers, hereinafter also referred to by the acronym CBU, labelled $CBU_A$, $CBU_B$, $CBU_C$ etc., at every GSM transmitter A, B, C etc., able to receive not only the signals from their own local transmitters but also those from at least two other distant transmitters. We also see a number of handsets incorporating roving receivers, hereinafter also referred to using the acronym CRU, labelled $CRU_1$, $CRU_2$ etc., active in the region. It is important that these handsets can also receive the signals from the same set of distant transmitters as well as from the local transmitter. As noted above, it is not necessary to achieve a high signal-to-noise ratio for reception of the distant signals, but nevertheless the need to receive distant transmitters may limit the usefulness of this system in rural areas where cells are very widely separated. Also shown in FIG. 4 are the position determining processor (CPP) and a service provider database (SPD). This is a device which provides position-related data specific to a request by the user of the position determining system. For example, the user may need directions to find the railway station in an unfamiliar city. The position determining processor would compute the user's position and pass it to the service provider database together with the user's request. The database would respond with the required list of instructions. The configuration shown here, in which the position determining processor is a stand-alone remote unit, is just one of several possible configurations (see below). For example, the CPP and CRU might be combined together inside the handset so that position processing is carried out by the handset's own computer.

There needs to be established a trigger code which is broadcast periodically from each transmitter, probably within the BCCH logical channel. As noted above, this could be a special code set up within the existing GSM framework, or it might be a repeating element of the ordinary GSM signals themselves, such as the arrival of a frame number ending in three zeroes which occurs every 4 seconds. The arrival of the trigger code causes an active roving receiver (CRU) to begin the process of recording the signals from at least three transmitters. There may sometimes be a commercial advantage in making the trigger code unique to a particular operator or even to a particular handset, thus providing one means of charging users for the position determining service. (There are of course many other possible ways of charging.) The trigger code also activates the recording mechanism in the base unit (CBU) attached to the GSM transmitter. Since most GSM handsets can receive only one RF channel at once, the order in which to record the distant signals must first have been established, for example by using cell broadcast or the short message service. We see below that it might also be necessary to record the local transmitter signals a second time in order to take account of drifts over the recording period. If 2048 samples are recorded for each of the two distant transmitters (1024 each of I and Q quadrature-phase signals), and 4096 samples for the local transmitter (two sets of 2048). the whole process can be completed within a few hundred ms including the time taken to switch between the channels and settle on each new frequency. The recordings made by the roving receiver (CRU) and base receiver (CBU) are then sent by any convenient means to the position determining processor (CPP). The roving receiver could use, for example, slots in the GSM signals, or it could set up a data transfer call. The base receiver would probably send its recordings by landline to a remote position determining processor. The processor receives and assembles in memory its own copies of the signals received by the base and roving receivers for correlation and position processing. It might also use other parameters of the signals recorded by the two receiving stations such as signal strengths.

Once the data have been assembled, the processor then performs the cross correlation analysis. Standard methods may be used, but a preferred method is described later which reduces the effects of multipath propagation. Having made estimates of $\Delta t_a$, $\Delta t_b$ and $\Delta t_c$, the processor solves the equations to evaluate x and y. However, the need to receive the signals from the three transmitters sequentially introduces a complication in that the synchronisation error, $\epsilon$, is changing all the time and is unlikely to be constant over the period of recording. We can model this error over short periods as an offset plus a linear slope, i.e.:

$$\epsilon = \epsilon_0 + \epsilon_1 t$$

where $\epsilon_0$ and $\epsilon_1$ are constants, and t is the time. We have a further unknown quantity to evaluate, $\epsilon_1$, and we can do this by recording the signals from the local transmitter again for a second time (at both base and rover). We now obtain four values of $\Delta t$ made at sequential times $t_1$, $t_2$, $t_3$, and $t_4$, and equations (1) become:

$$\Delta t_a(t_1) = \frac{[(x-a_x)^2 + (y-a_y)^2]^{1/2} - (a_x^2 + a_y^2)^{1/2}}{v} + \varepsilon_0 + \varepsilon_1 t_1 \quad (2)$$

$$\Delta t_b(t_2) = \frac{[(x-b_x)^2 + (y-b_y)^2]^{1/2} - (b_x^2 + b_y^2)^{1/2}}{v} + \varepsilon_0 + \varepsilon_1 t_2$$

$$\Delta t_c(t_3) = \frac{[(x-c_x)^2 + (y-c_y)^2]^{1/2} - (c_x^2 + c_y^2)^{1/2}}{v} + \varepsilon_0 + \varepsilon_1 t_3$$

and $$\Delta t_a(t_1) = \frac{[(x-a_x)^2 + (y-a_y)^2]^{1/2} - (a_x^2 + a_y^2)^{1/2}}{v} + \varepsilon_0 + \varepsilon_1 t_4$$

The first and last of these equations can be subtracted to give $$\Delta t_a(t_4) - \Delta a(t_1) = \epsilon_1(t_4 - t_1)$$

from which $\epsilon_1$, can be found. Hence with four estimates of $\Delta t$ equations (2) can be evaluated to recover x and y.

Handsets containing multi-channel receivers able to receive all three channels simultaneously do not need to repeat the recording of the signals from transmitter A since the rate of drift between the clocks (measured by $\epsilon_1$) is then of no consequence and does not need to be determined. High-quality single-channel handsets may also be able to dispense with the repeated recording if the drift in the clock error is small enough to ignore.

Figure 5:
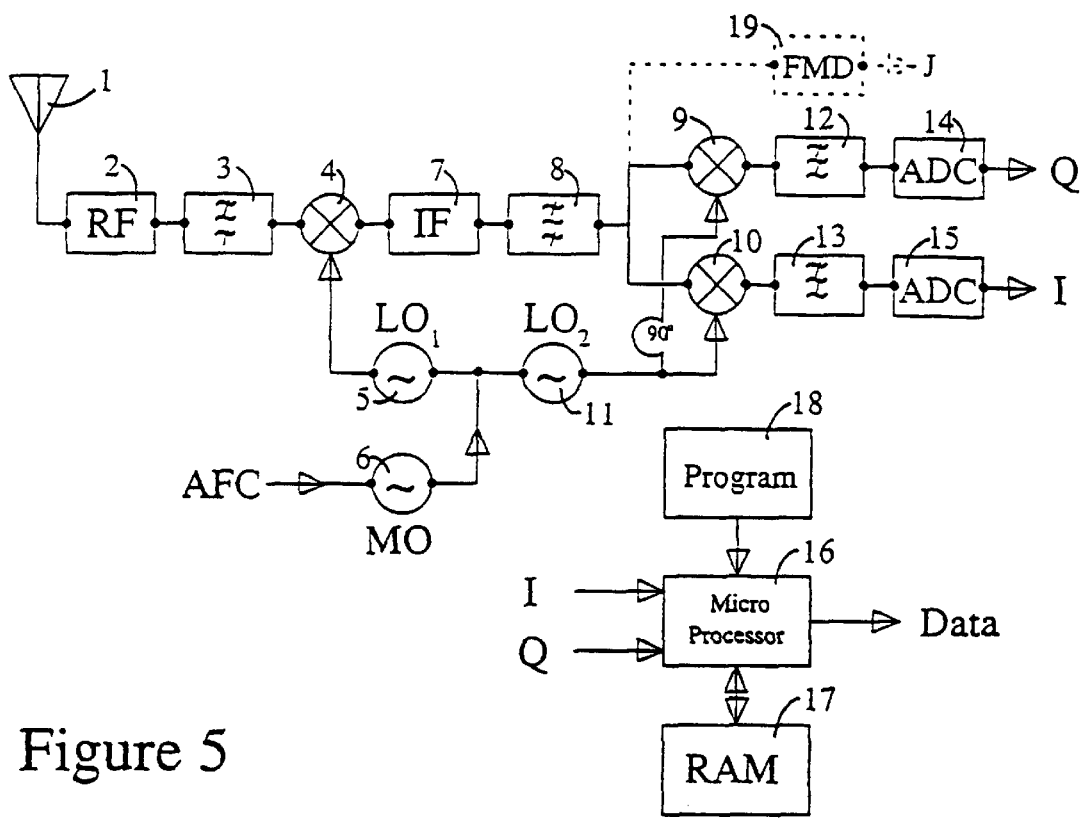
FIG. 5 illustrates the basic circuit components of a GSM handset.

As noted above, almost all the hardware elements needed inside a GSM handset for the purposes of the present invention exist already for normal GSM operation. FIG. 5 illustrates a typical implementation. The RF signals in the region of 900 MHz or 1800 MHz are received by antenna 1, amplified in the RF amplifier 2, and filtered in the RF bandpass filter 3. before being mixed to the intermediate frequency, IF, in mixer 4 with a local oscillator signal $LO_1$, generated by oscillator 5. $LO_1$ already incorporates the necessary channel switching ability. It is important for the present invention that its frequency is phase-locked to that of a master oscillator. MO. usually a crystal oscillator 6. This is also a requirement for normal GSM operation so it imposes no additional costs. The IF signals are amplified in amplifier 7, filtered by the bandpass filter 8, and converted to baseband in quadrature mixers 9 and 10 using the signal, $LO_2$, from a second local oscillator 11. As with $LO_1$. this second oscillator also needs to be phase-locked to the master oscillator. However, fine tuning (automatic frequency control, AFC) is often also incorporated into the loop which must be held constant during the recording process. Quadrature outputs are filtered by the lowpass filters 12 and 13, digitised in analogue-to-digital converters 14 and 15, and the bit streams labelled I and Q are produced. Position determination then just requires the microprocessor 16 to make recordings of the bit streams in dynamic ram 17 under the control of the program 18. There might be a need for some additional memory. The main modification to enable position determination is in the firmware program running on the microprocessor, and it might be necessary to upgrade the processor itself to a faster model. Similar equipment is needed in the base receiving station.

A commercially limiting element in a system according to the present invention is likely to be the means by which the signals recorded at the base and rover are transferred to the position determining processor for cross correlation. It is therefore important to reduce the number of bits transferred as much as possible. As noted above, one-bit sampling produces adequate results even under conditions of poor signal reception, and although slightly better accuracy can be obtained using, say, two-bit sampling, the increase in the link load is likely to be unattractive. Indeed, it is probably better to double the number of one-bit samples, and hence double the length of the sampling interval, than to use two-bit samples. It may also be necessary to measure both I and Q channels and to perform a complex cross correlation, since the base and rover signals are unlikely to be in phase with each other, and the crystal oscillators are not locked together. Let the quadrature bit streams at the rover (CRU) be represented by I and Q (see FIG. 5), where $$I = V_1(t)\cos(\theta_1)$$

and $$Q = V_2(t)\sin(\theta_1)$$

where $\theta_1$ is the phase of the signals, and $V_1(t)$, $V_2(t)$ are their amplitudes. The corresponding quantities recorded at the base (CBU) are $$I' = V_1'(t)\cos(\theta_2)$$

and $$Q' = V_2'(t)\sin(\theta_2)$$

The microprocessor must then compute four cross correlations corresponding to II', QQ', IQ', and I'Q, and then seek the peak in the quantity $\rho$, where $$\rho = \sqrt{(II' + QQ')^2 + (IQ' - I'Q)^2}$$

The phase difference, $\theta = \theta_1 - \theta_2$, can also be obtained from $$\theta = \tan^{-1}\left\{\frac{I'Q - IQ'}{II' + QQ'}\right\}$$

and this can be used to take out the small frequency offset between the local oscillators in the base and rover so that longer integration is possible.

Equations (1) and (2) above show how estimates of the time delays, $\Delta t$, may be used to deduce the position (x, y) of the rover and the synchronisation error, $\epsilon$, between the base and rover. Central to this process is the accuracy with which estimates of $\Delta t$ can be obtained from the cross correlations. As noted above, the major limitation to the accuracy is likely to be caused by multipath propagation of the signals from the GSM transmitter to the rover. It is assumed that the antenna at the base has been installed high enough above surrounding clutter to ensure that multipath propagation is small enough to be ignored. In these circumstances, multipath propagation to the rover causes the cross correlation profile to be spread out towards longer delay times since the most-direct signals arrive first. The preferred method for obtaining an estimate of $\Delta t$ is based on using auto-correlations (ACF) of the base and rover signals as well as the cross-correlation (CCF) between them. We use the two auto-correlations to deduce the likely shape of the cross-correlation, and then fit that 'template' to the cross-correlation to obtain the best estimate of $\Delta t$.

Figure 6:
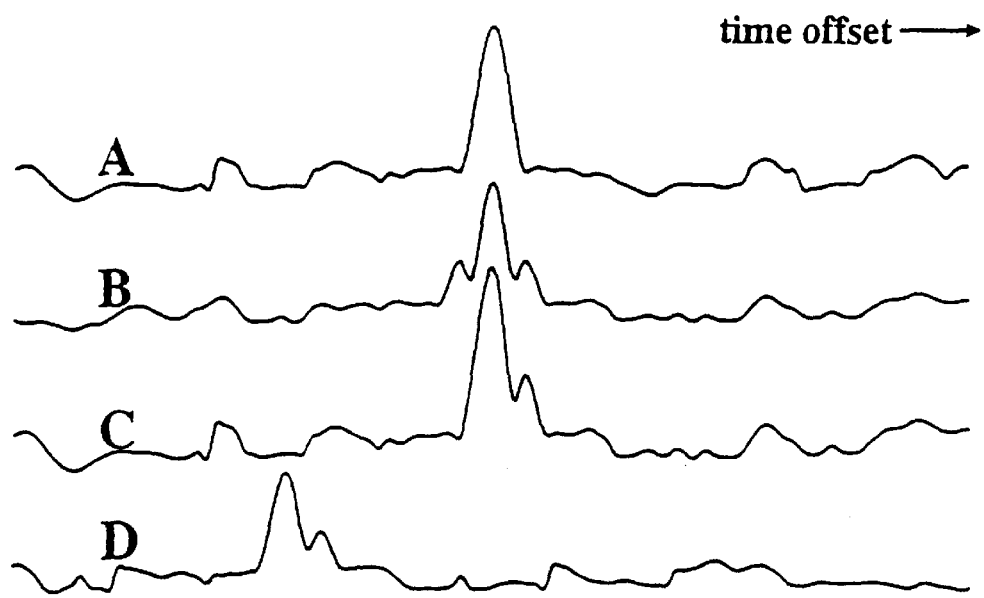
FIG. 6 illustrates a particular method of overcoming the effect of multipath propagation on measuring relative time delays.

The two auto-correlations, $ACF_{CRU}$ and $ACF_{CBU}$, together with the cross correlation, CCF. may be obtained by any of the standard means (see for example in "Random Data: analysis and measurement procedures" by J. S. Bendat and A. G. Piersol, Wiley-Interscience, 1971); we prefer the methods which involve fast Fourier transforms. The $ACF_{CBU}$ is a good estimate of the 'intrinsic' auto-correlation of the transmitted signals (negligible multipath effect) whilst the $ACF_{CRU}$ is likely to be corrupted by multipath signals, i.e. signals delayed by more than about 30 m equivalent path. This is shown for a particular example in FIG. 6. where trace A is $ACF_{CBU}$ and B is $ACF_{CRU}$. We can see that multipath has given rise to secondary peaks in trace B which appear on both sides of the main peak since the auto-correlation is always symmetrical. The 'template' is constructed by taking the left-hand portion of $ACF_{CBU}$ (i.e. the trace to the left of the central peak in A corresponding to the negative time axis) and joining it to the right-hand portion of $ACF_{CRU}$ (i.e. the trace to the right of the central peak in B corresponding to the positive time axis). This is shown in FIG. 6 trace C. The measured CCF is shown by trace D, and we can see that the template C reproduces the major features. The estimate of the time offset, $\Delta t$, is then obtained by fitting the template to the measured CCF using any standard method. allowing the amplitudes of the two halves of the template to be free parameters as well as $\Delta t$. The fitting procedure also produces a 'goodness of fit' parameter which may be used as a basis for rejection or inclusion of the data.

In cases where more than three GSM transmitters can be received at both base and rover, it may be an advantage to use them all in the position determining process, especially if one or more of the paths is substantially indirect. In such a case, the goodness of fit parameter can provide a weighting factor for each $\Delta t$ to be used in evaluating the position.

GSM handsets incorporate multi-level Analogue-to-Digital Converters (ADCs) and use adaptive processing techniques in order to reduce the errors resulting from multipath propagation. It may therefore be possible to use the demodulated signals themselves for the cross correlation function rather than the raw I and Q data streams from the receivers, depending on the design of the handset. Such extra delay put in by the adaptive processing must be removed of course, and no amount of processing can allow for the unknown extra path length of a wholly-indirect signal, but the demodulated output may nevertheless be better for estimating time-delays than the pre-processed I and Q raw data streams. Shown in dotted outline in FIG. 5 is an FM discriminator 19 (FMD). FM discrimination translates a frequency offset into a steady (DC) shift in the output, so quadrature signals (I and Q) are not needed, but are replaced by a single signal (J in FIG. 5). This offers two further advantages in that (a) half as much data need be transferred over the links, and (b) it is unnecessary to adjust for the frequency offset at the position determining processor thus reducing the processor overhead.

Figure 7A:
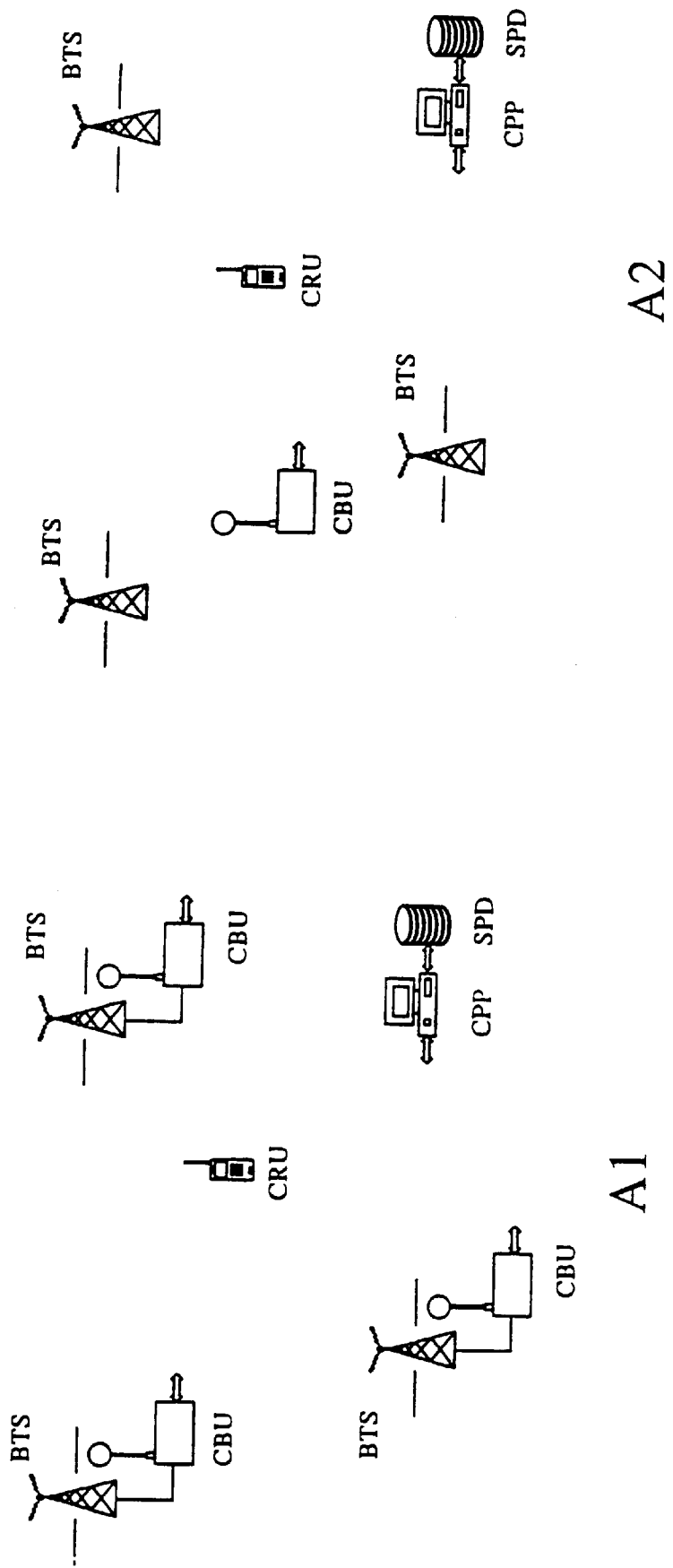
FIG. 7 (*a, b, c*) shows various different configurations of the elements in a GSM system incorporating the invention.
Figure 7B:
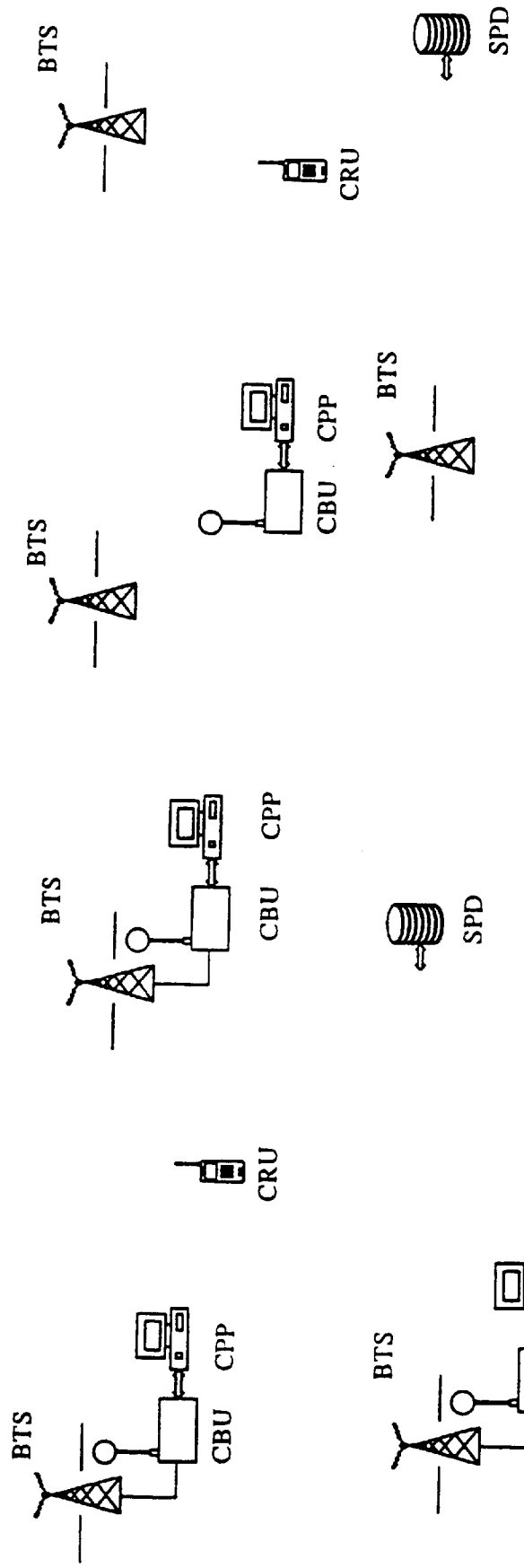
Figure 7C:
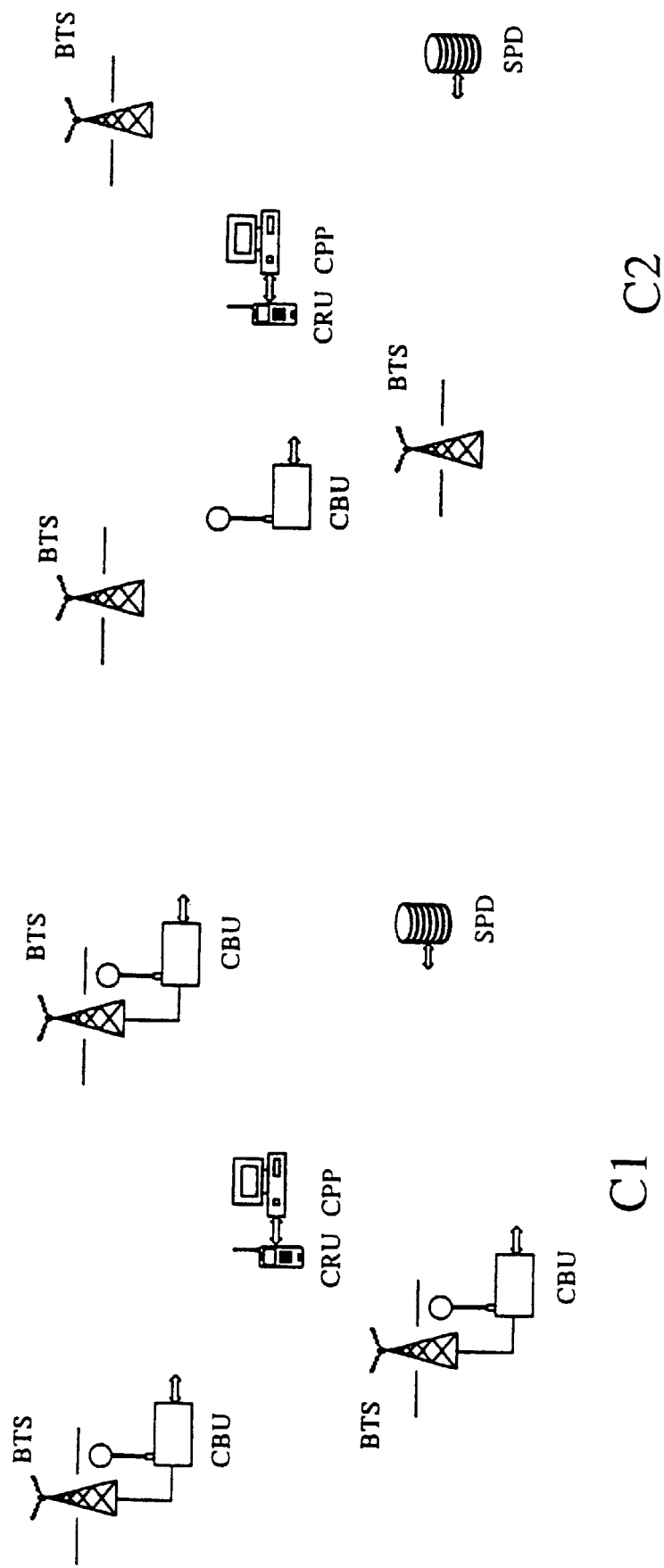

As noted above, several different configurations of a position determining system according to the present invention are possible, depending on the relative locations of the GSM transmitters (often called Base Transceiver Stations, BTSs), the roving receivers (CRUs), the base receivers (CBUs), the position determining processor (CPP), and a service provider database (SPD). Three configurations are illustrated in FIGS. 7a, 7b, and 7c, denoted A, B, and C. Each of these is further subdivided into two. FIG. 7a shows configuration A in which the CPP and SPD are co-located at a position remote from both the CBU and CRU. This could be the case, for example, when one CPP/SPD combination serves an entire region. In A1 each BTS has a CBU co-located with it. In A2 the CBU serving the local cell embraced by the three BTS is shown somewhere within the cell. Configurations B1 and B2 (FIG. 7b) are similar to A1 and A2 respectively except that there are now many CPPs. In B1 each BTS has a CBU attached to it; in B2 each triangle of three BTSs has a CPP within it of which just one is shown in the Figure. The regional SPD remains at a remote location. Configurations C1 and C2 (FIG. 7c) are similar to A1 and A2 but with the position processing carried out within each handset. Other configurations are also possible, each having relative advantages making them suited to particular commercial applications.

Figure 8:
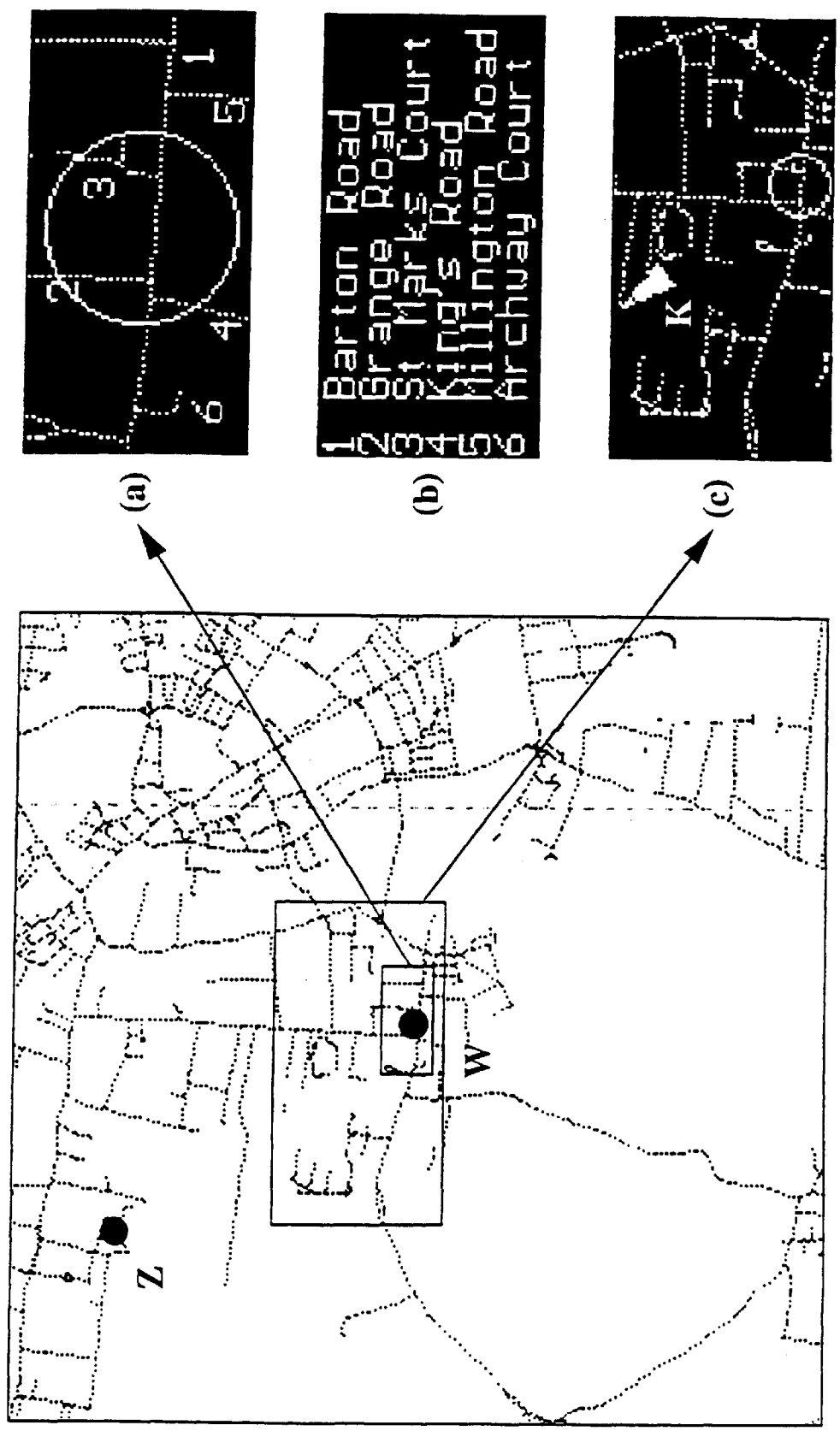
FIG. 8 illustrates how position information may be displayed graphically on a small liquid crystal display.

In some commercial applications, it may be an advantage to display map information in graphical form as part of the response of the service provider database to a request for a position-related service. An example of this is given in FIG. 8 where it is shown how a map of the local area might be displayed on a screen attached to the position determining processor or at a monitoring station. The user has requested directions to a location marked by a filled circle labelled Z, and the position determining processor has computed the user's position to be somewhere within the filled circle labelled W. The user's handset includes a liquid crystal dot-matrix display which can display small portions of the larger map as well as character-based information. The first screen displayed on the handset might be as shown in the panel marked (a) in FIG. 8. This is a large scale map of the local area with the circle, radius 100 m, centred on the calculated position. The roads are marked 1, 2, 3 etc., corresponding to the names indicated on the second screen, panel (b). The user can scroll back and forth between screens at will. Panel (c) shows a larger scale map of the local area, together with a pointer, K, which indicates the direction of the target destination, Z. Clearly, many other screens of information are possible, including one giving the address of the target destination, local traffic conditions, approximate distance, etc. In a commercial application, there might also be scope for a limited amount of advertising on the handset display.

Tests of Prototype System

Figure 9:
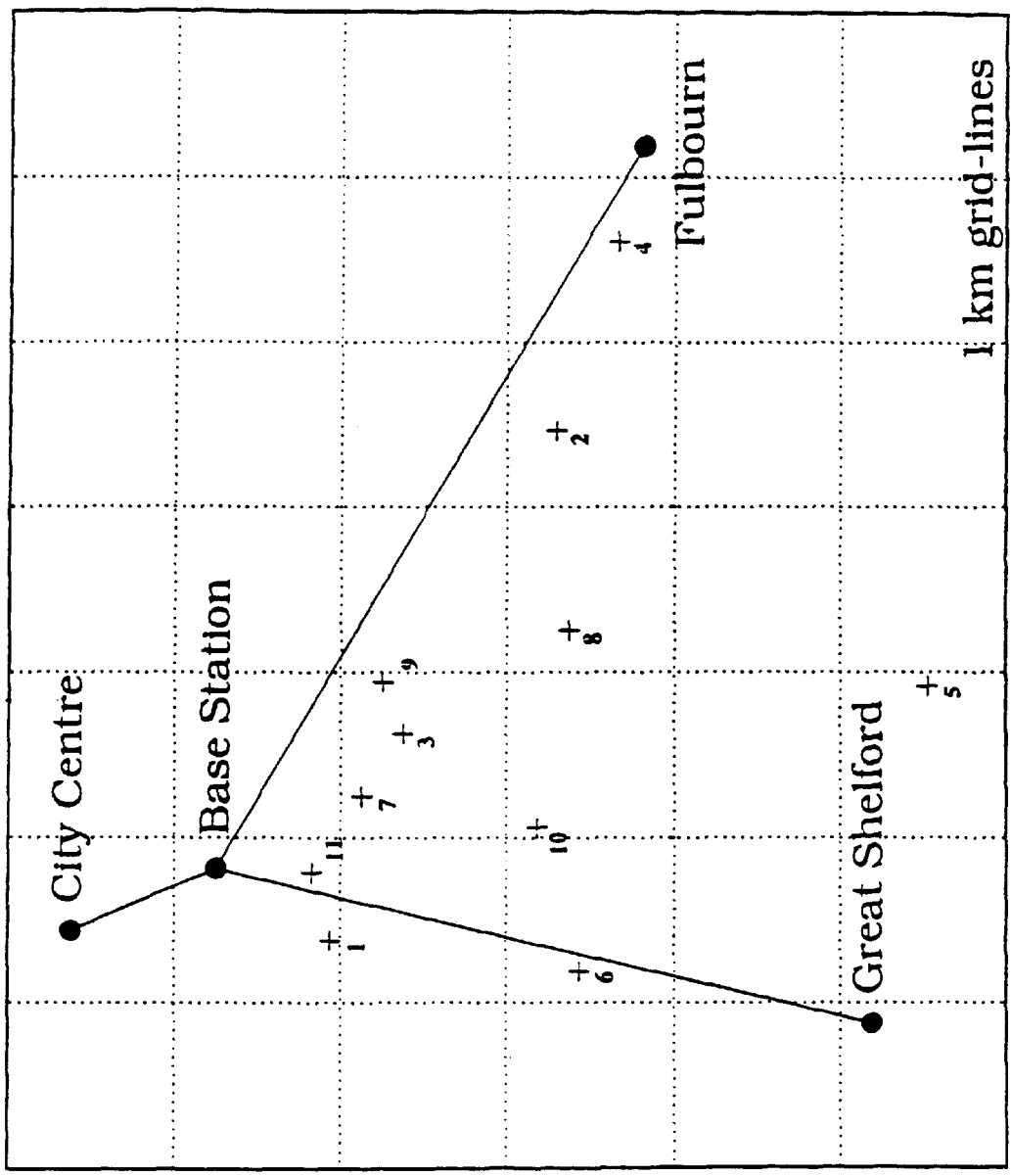
FIG. 9 illustrates the arrangement of elements and test sites in a trial carried out in Cambridge, UK.

A prototype test apparatus using a pair of standard hand portable units and some additional recording equipment was set up in Carnbridge, UK. The base station (CBU) was in a three-storey building near the city centre (see FIG. 9) with the antenna fixed on the roof. The roving receiver (CRU) was carried in a car to various locations in the south of the city as shown by the crosses in FIG. 9. Three GSM transmitters (BTSs) were used in the trial, located respectively in the city centre, at Great Shelford to the south, and at Fulbourn to the south east. Table 2 gives the mean positional errors in both co-ordinates, i.e. the differences between the averages of about 10 independent position determinations and the true positions as measured on a map. Simple data analysis techniques were used with no special discrmination against the effects of multipath propagation. The inherent accuracy of the apparatus, found from tests with both base receiver and roving receiver side-by-side on the bench, was less than 20 m rms. Tests numbers 1 to 6 were performed with the rover sationary; tests 7–11 were made at speeds between 40 and 64 km h$^{-1}$.

TABLE 2

| Location number | Mean error East (m) | Mean error North (m) |
| --- | --- | --- |
| 1 | 66.5 | −59.5 |
| 2 | −5.5 | 80.0 |
| 3 | −68.0 | −15.0 |

TABLE 2-continued

| Location number | Mean error East (m) | Mean error North (m) |
|---|---|---|
| 4 | 89.0 | 90.0 |
| 5 | −19.0 | 41.0 |
| 6 | 64.0 | 79.0 |
| 7 | −73.0 | 6.0 |
| 8 | −62.0 | 59.0 |
| 9 | 17.0 | 128.0 |
| 10 | 43.0 | 31.0 |
| 11 | 95.0 | 105.0 |

We claim:

1. A position determining system, for receiving broadband signals transmitted by a number of transmission sources equal at least to the number of dimensions in which the movement of a roving object is to be monitored, the system comprising a pair of recevng stations, in use the first of the receiving stations being at a known position and the second being located on the roving object;

a position determining processor;

means for passing a link signal from each of the receiving stations to the position determining processor, the link signal containing information about the signals received at the receiving station from the transmission sources;

wherein each of the receiving stations is arranged to receive the signals from the respective transmission sources substantially simultaneously by monitoring for receipt of a specific portion of the transmitted signals, and the position determining processor is arranged to compare the information received from the one receiving station about the signals received at the one receiving ston from the transmission sources with the information received at the other receiving station about the skis received at the other receiving station from the transmission sources, and to determine the time delay between the respective signals received at both receiving stations in order to determine the position of the roving object.

2. A position determining system according to claim 1 in which the receiving stations may receive the signals from the respective transmission sources sequentially and in the same sequence as each other.

3. A position determining system according to claim 1, wherein each of the receiving stations is also arranged to receive a second signal from one or more of the transmission sources.

4. A position determining system according to claim 1, wherein the position determining processor is co-located with one of the receiving stations.

5. A position determining system according to claim 4, wherein the link signal from one of the receiving stations is passed to the other receiving station and from the other receiving station to the position determining processor.

6. A position determining system according to claim 1, wherein the position determining processor is located remote from the receiving stations.

7. A position determining system according to claim 1, wherein a signal providing information about the position of the roving object is passed from the position determining processor to at least one of the receiving stations.

8. A position determining system according to claim 1, further comprising a monitoring station and wherein a signal providing information about the position of the roving object is passed from the position determining processor to the monitoring station.

9. A position determining system according to claim 8, further comprising a database server connected to said position determining processor, said database server containing data elements relating to a plurality of known positions;

means for passing information about the position of the roving object determined by the position determining processor to the database server;

means for retrieving data elements related to the position determined by the position determining processor; and means for passing the data elements to one of the receiving stations or to the monitoring station.

10. A position determining system according to claim 9, wherein the or each receiving station or the monitoring station includes a display and the position of the roving object is displayed on the display.

11. A position determining system according to claim 10, wherein the display comprises a dot matrix display.

12. A position determining system according to claim 10, wherein the database server contains graphical information and said graphical information is passed to the receiving station or monitoring station and displayed on the display to indicate the position of the roving object.

13. A position determining system according to claim 1, wherein the transmission sources and receiving stations comprise components of a digital cellular telephone network.

14. A position determining system according to claim 13, wherein the digital cellular telephone network is a GSM network.

15. A position determining system according to claim 1, wherein the receiving stations monitor the strength of the signals of plural transmission sources and select a plurality of sufficiently strong signals for reception.

16. A method of determining the position of a roving object, the method comprising transmitting broadband signals from a number of transmission sources equal at least to the number of dimensions in which the movement of a roving object is to be monitored; receiving the signals at a pair of receiving stations, in use the first of the receiving stations being at a known position and the second being located on the roving object, each of the receiving stations being arranged to receive the signals from the respective transmission sources substantially simultaneously by monitor for receipt of a specific portion of the transmitted signals; passing link signals from each of the receiving stations to the position determining processor, the link signals containing information about the signals received at the respective receiving station from the transmission sources; comparing the information received at the position determining processor from the one receiving station about the signals received at the one receiving station from the transmission sources with the information received from the other receiving station about the signals received at the other receiving station from the transmission sources; and determining the time delay between the reserve signals received at the receiving stations in order to determine the position of the roving object.

17. A method according to claim 16, wherein the broadcast signal is a digital cellular telephone network transmission signal.

18. A method of estimating the offset in time of receipt of a broadcast signal received at two locations, where the signal received at one of said two locations is subject to corruption by multipath effects, the method comprising autorelating the signals received at the one of said two locations; auto-correlating the signals received at the other of said two locations; cross-correlating the signals received at the one and other of said two locations; constructing a template comprising that portion of the auto-correlation of the signals received at the other of said two locations corresponding to offset times before that of the central peak, and that portion of the auto-correlation of the signals received at the one of said two locations corresponding to offset times after that of the central peak; and measuring the offset at which the template best fits the measured cross-correlation of the signals received at the one and other of said two locations as an estimate of the time offset between the signals received at the two locations.

* * * * *

UNITED STATES PATENT AND TRADEMARK OFFICE
CERTIFICATE OF CORRECTION

PATENT NO. : 6,094,168
DATED : July 25, 2000
INVENTOR(S) : Duffett-Smith et al.

It is certified that error appears in the above-identified patent and that said Letters Patent is hereby corrected as shown below:

The international filing date information on the face page of the patent is corrected to read as follows:

[22] PCT Filed: September 19, 1996

Signed and Sealed this

Second Day of October, 2001

Attest:

*Nicholas P. Godici*

NICHOLAS P. GODICI
*Attesting Officer*     *Acting Director of the United States Patent and Trademark Office*